United States Patent [19]

Chen

[11] Patent Number: 5,392,078
[45] Date of Patent: Feb. 21, 1995

[54] STRUCTURE FOR NOSE PIECES OF SPECTACLES

[76] Inventor: Ming-Chieh Chen, 1th, Fl., No. 28, Alley 16, Lane 102, Sec 1, Chung Young S. Rd, Taipei, Taiwan, Prov. of China

[21] Appl. No.: 72,280

[22] Filed: Jun. 4, 1993

[51] Int. Cl.⁶ .............................................. G02C 5/12
[52] U.S. Cl. .................................... 351/136; 351/138
[58] Field of Search .............. 351/136, 137, 138, 76, 351/77, 78, 140

[56] References Cited

U.S. PATENT DOCUMENTS 4,556,300 12/1985 Dietrich .............................. 351/136
4,792,222 12/1988 Labenz et al. ...................... 351/136

FOREIGN PATENT DOCUMENTS 0053313 4/1980 Japan ................................... 351/136

*Primary Examiner*—William L. Sikes
*Assistant Examiner*—Huy Mai
*Attorney, Agent, or Firm*—Pro-Techtor International

[57] ABSTRACT

An improved structure for nose pieces of spectacles, comprises two nose pieces made of soft plastic in concaved shapes and having their front faces planted with fine down and provided with a plurality of air permeable holes, a connecting axle integrally protruding from the nose piece with a protruding ball extending into a base and being able of automatic orientation adjustment and being pressed in the base by a pressing detent which in turn being pressed by a torsional spring, the structure each can be clamped onto a seat (on the spectacles) for a nose piece so as not to be subjected to falling off and is convenient for assembling, the nose piece with this structure can best fit to the bridge of a nose.

1 Claim, 4 Drawing Sheets

A — A

STRUCTURE FOR NOSE PIECES OF SPECTACLES

BACKGROUND OF THE INVENTION

Spectacles, and especially the ones with a metallic frame, have nose pieces used for contacting with both sides of the nose bridge of a wearer of the spectacles, which pieces are separately mounted (ordinary plastic or fiber frame is integrally formed with nose pieces, but is not within the field to which the present case is directed). Such kind of structure has at the positions near the center of the frame two hollowed seats (for nose pieces), with holes on the front as well as the rear walls thereof, and has two nose pieces made of plastic each being integrally composited with a connecting axle which has a through hole; when each nose piece is assembled with a seat therefor, one connecting axle is inserted in the seat to have its through hole aligned with the said holes, then a screw is inserted from the hole on the front wall of the seat and through the through hole, and lastly through the hole on the rear wall of the seat, in this way, the nose piece can be pivotally seated in the seat. Such a traditional structure has nevertheless the following defects:

(1) When a connecting axle of a nose piece is inserted in a seat, it must be held by one hand of a person, while a screw also must be inserted by the other hand, and then a screw driver is used to turn the screw tight; such a procedure is quite bothersome, and is proceeded so cautiously as not to let off the nose piece or the screw, or else they will be so hard to be looked for.

(2) When the nose piece is pivotally mounted in a seat, the amplitude for it to swing is very small; Further, due to the disacuracy created in manufacturing, the mounting of the nose piece is normally over-tight or over-loose, such that the spectacles can not fit best to the bridge of a wearer's nose and, thus loses its comfort, and more, this could create failure in focal involution between a lens and an eyeball, and thus adversely affect the vision.

(3) The nose pieces are made of plastic or fiber material, the bridge of the nose will feel hard when being contacted with the nose pieces, both sides of the bridge will suffer from pain after a long term wearing of the spectacles, and the said sides will leave concaved red prints in the shapes of the nose pieces as a trouble for the wearer.

(4) The surfaces of the nose pieces are of hard material, the friction between them and the bridge will be reduced when the wearer is sweating in exercising or when his face is oily, in this case, the whole pair of spectacles will slide down, and the wearer should push up them frequently and patiently for the proper sight.

SUMMARY OF THE INVENTION

The inventor has studied the above stated defects and invents an improved structure for nose pieces based on my many years experience in designing and manufacturing products relating to spectacles, which structure can effectively solve the said defects, and bestows the easiness in assembling, comfort of wearing, air permeability, slide proof, and automatic angle adjustment on the spectacles.

The present invention can be further understood as to the structural features as well as the pracality thereof when read the following detailed description of a preferred embodiment thereof in reference to the accompanying drawings.

DETAILED DESCRIPTION OF A PREFERRED EMBODIMENT

Figure 1:
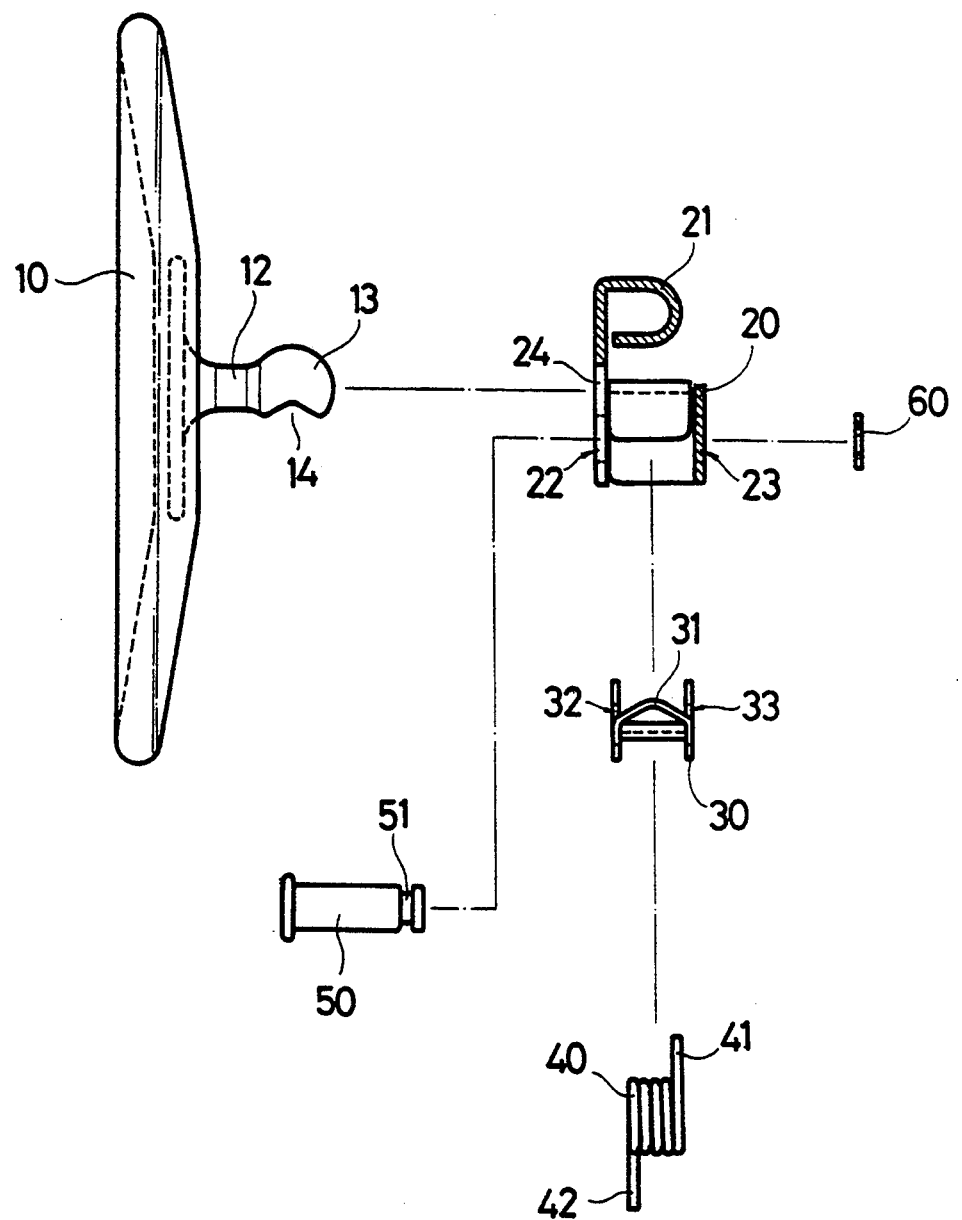
FIG. 1 is an anatomic schematic view of the present invention.
Figure 2:
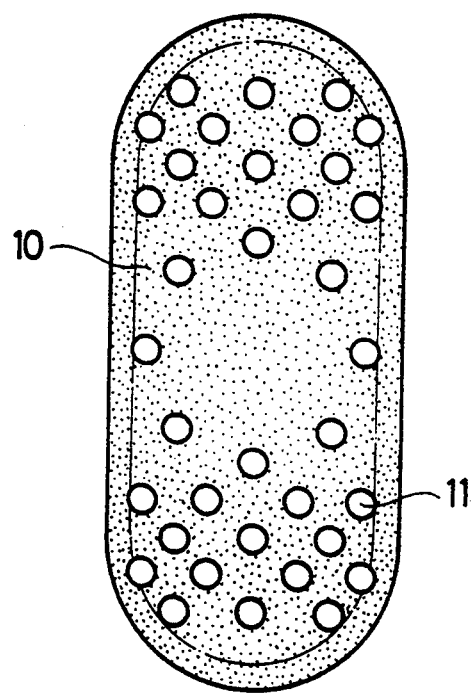
FIG. 2 is the front view of a nose piece portion of the present invention.
Figure 4:
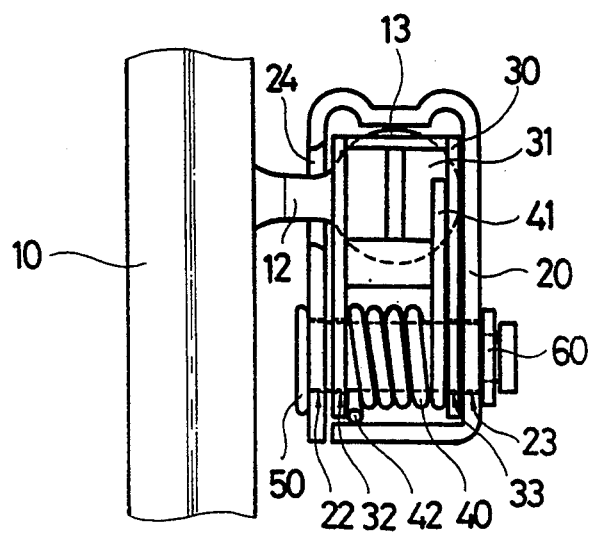
FIG. 4 is a partial sectional view showing the assembling of the present invention with a nose piece looked in the bottom side thereof.
Figure 5:
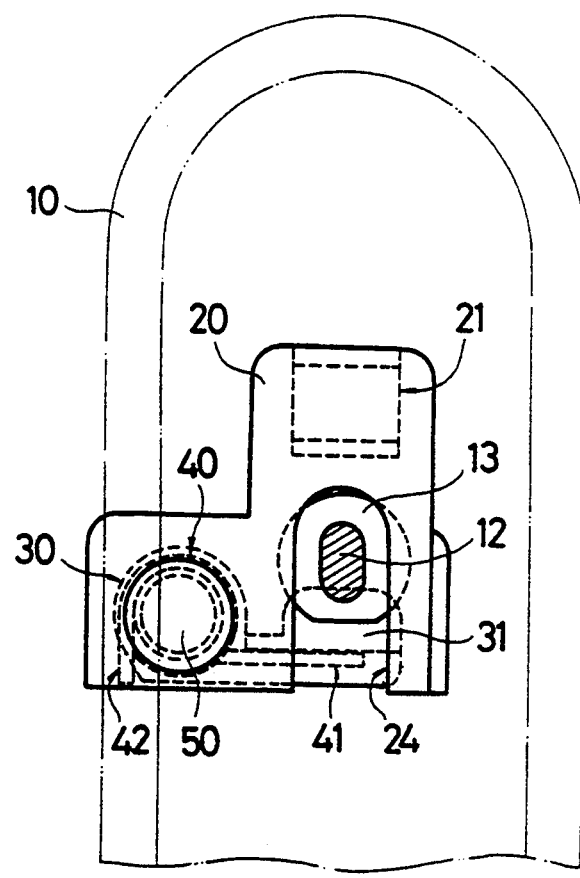
FIG. 5 is a sectional view taken from A—A section line in FIG. 3.

Referring to FIG. 1, the present invention is comprised mainly of two nose pieces 10, two bases 20, two pressing detent 30, two torsional springs 40, two latching axles 50, and two E shaped buckles 60, wherein:

the nose piece 10: referring also to FIG. 2, it is made of soft plastic and is of a concaved elliptic shape, the front face thereof (this surface being concaved and being contacted with the bridge of the nose) is planted with fine down, the whole piece has a plurality of air permeable through holes 11, a connecting axle 12 is integrally protruded from the rear face of the nose piece 10, on the end of the connecting axle 12 there is a protruding ball 13 which has a concaved lateral side surface 14.

the base 20: also please referring to FIG. 4 and 5, it is hollowed, the upper end thereof protrudes as a P shaped head 21 which can be put into the seat 70 for the nose piece, the lower end thereof is provided with two holes 22, 23 running through respective the left and the right sidewalls thereof and an opening 24 for passing through of the connecting axle the pressing detent 30: also please referring to FIG. 4 and 5, a pressing arm 31 is protruding therefrom for matching with the concaved side face 14 of the aforementioned protruding ball 13, and two holes 32, 33 are provided respectively on the left and the right sidewalls thereof.

the torsional spring 40: also please referring to FIG. 4 and 5, it can be holded exactly in the lower end of the aforementioned base 20, two spring legs 41, 42 thereof are used to prestore a torsional spring force.

the latching axle 50: an annular groove 51 is provided on one end thereof, the shank of the axle can be extended through the aforementioned holes 22, 23 located on the lower end of the said base 20.

the E shaped buckcle 60: it can buckcle into the annular groove 51 of the aforementioned latching axle 50.

Figure 3:
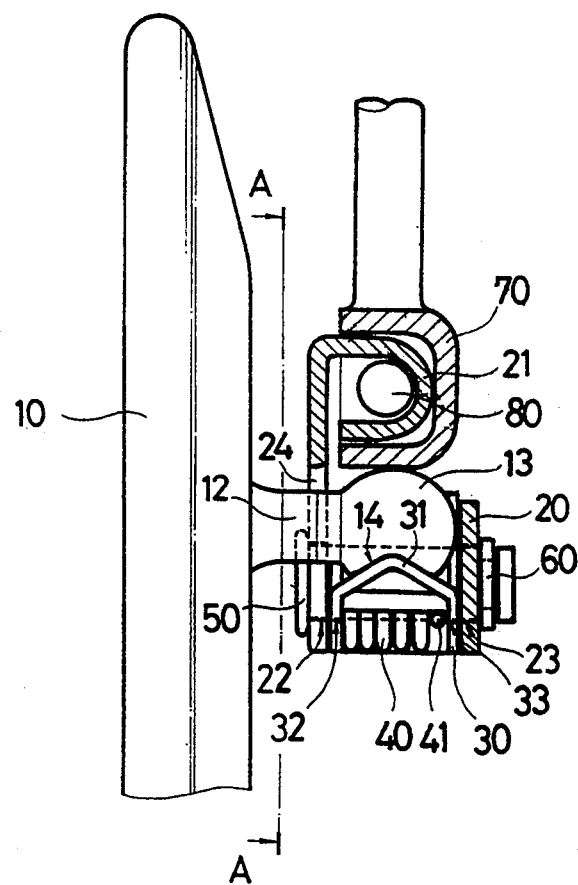
FIG. 3 is a partial sectional view showing the assembling of the present invention with a nose piece looked in the front side thereof.

As shown in FIG. 3, 4, and 5, in the above stated structure, the assembling of the members of the present invention and especially of the structure of the present invention with the seat 70 for the nose piece is achieved by inserting the connecting axle 12 of the nose piece 10 into the opening 24 of the base 20, and putting the torsional spring 40 into the pressing detent 30 to align with the holes 32, 33, and then putting the pressing detent 30 (with the torsional spring 40) into the base 20, letting the pressing arm 31 of the pressing detent 30 contact with the concaved surface 14 on the protruding ball 13, and letting the holes 32, 33 align with the holes 22, 23 of the base 20, then twisting the torsional spring 40 and its legs 41, 42 by suitable rotation to render the leg 41 to brace against the pressing detent 30 while render the other leg 42 to press against the inner wall of the base 20, thus forming a prestored torsional force, then inserting the latching axle 50 from the hole 22 on one end of the base 20 to extend through the hole 32, the torsional spring 40, the hole 33, and the hole 23 to protrude out from the other end of the base 20, by this time, the annular groove 51 will be exposed to allow the E shaped buckle 60 to clamp into the annular groove 51 and complete the assembling, therefore, the latching axle 50 may not fall off.

When two sets of the structure of the present invention has been assembled and are going to be connected respectively to two seats 70, the P shaped heads 21 of the bases 20 can be simply put into the interiors of the seats 70, and two screws 80 can be put through the holes in the seats 70 and the interiors of the P shaped heads 21, and then be threadedly tightened in the holes provided at the other ends of the seats 70.

The above stated structure of the present invention provides with the following functions:

(1) The protruding ball 13 is passed by the pressing detent 30 (while the detent 30 is in turn pressed by the torsional spring 40), so that it always presses toward the P shaped head 21; Due to this action, when the structure is to be connected to the seat 70, a wall of the seat will be clamped between the P shaped head 21 and the protruding ball 13 as shown in FIG. 3, in this way, the structure can be clamped onto the seat 70 so as not to be subjected to falling off. Therefore, the screw 80 can be put on in an easy way, not in the way as that of a conventional structure wherein a nose piece must be held for inserting a screw, the present invention hence provides the effects of easy assembling and convenient operating.

(2) The protruding ball 13 pivotally seated in the interior of the base 20, is pressed by the pressing detent 30 which is in turn pressed by the torsional spring 40, however, the spring 40 is a flexible spring (not a stiff one), the ball 13 is therefore pivotable easily in the base 20, this feature allows the structure of the present invention (all the two sets of the nose piece structures) fits best the wearer's face as well as the bridge of the nose thereof regardless of the height and shape of it, i.e., it can automatically adjust its angle orientation to fit the nose; And thus it is comfortable to wear the spectacles with the present invention, yet the failure in focal involution between the lens as well as an eyeball can be eliminated.

(3) The nose piece 10 is made of soft plastic material and is in a form of slightly concaved ellipse, so that it functions as a soft sucker, and so that the contact between, it and the bridge of the nose is a soft contact being different from that (hard contact) of a conventional nose piece and a bridge; in this way, no solid pressure will be felt in a long term wearing of a pair of spectacles.

(4) The surface of the nose piece 10 provides with fine down, this, and the sucker function of the nose piece 10 itself, plus the best fit of the nose piece 10 to the bridge, can allow the nose piece 10 to firmly contact with the bridge of the nose, and is not subjected to falling off.

(5) The nose piece 10 has a plurality of air permeable through holes 11, so that the nose piece 10 car, remain the air permeability when it contacts against the bridge of the nose, the skin on the bridge can still have cutaneus respiration, so as to improve the comfort when in wearing.

It is worth emphasizing that, the protruding ball 13 and the pressing arm 31 of the pressing detent 30 in the structure of the present invention, can have a plane or arc contact beside the mode of angle contact between the concaved surface 14 and the protruding pressing arm 31 to achieve the same effect.

In conclusion, the novel structure design of the invention not only effectively eliminates the defects of the conventional structure of nose pieces, but also provides the above stated concrete improvements which are brand new in the field of products of the same class, such structure is therefore novel as well as practical.

My invention is to be construed as including all modifications and variations falling within the scope of the appended claims.

I claim:

1. An improved structure for nose pieces of spectacles comprising:

a nose piece made of soft plastic and having a concave shape, a front face thereof being covered with very soft, absorbent material, said nose piece including a plurality of air-permeable through holes, the nose piece further including a connecting axle integrally connected to said nose piece and protruding from a rear face of said nose piece, said axle including a protruding ball at an end not connected to said nose piece, said ball having a concave lateral surface;

a hollow base, an upper end thereof protruding as a P-shaped head which into a seat on said spectacles for said nose piece, a lower end of said base being provided with two holes respectively through left and right walls thereof, and further including an opening through which said connecting axle passes so that said protruding ball is pivotally seated in said base;

a pressing detent with a pressing arm protruding therefrom to mate with said concave lateral surface of said protruding ball, two holes being provided respectively through left and right walls thereof, said detent being pivotally mounted in said base, said pressing arm and said concave surface of said protruding ball being abutted against each other, with said holes in said pressing detent being aligned with said holes in said base;

a torsional spring being held fixedly in the lower end of said base, two spring legs of said torsional spring being used respectively to brace against said pressing arm and to press against an inner wall of said base to provide a torsional spring force;

a latching axle with an annular groove provided on a first end thereof, a shank of said axle being able to extend through said holes on said pressing detent as well as through an interior of said torsional spring to render said annular groove exposed at an end of said base;

an E-shaped buckle which buckles into said annular groove of said latching axle to fix said latching axle in place.

* * * * *